United States Patent [19]

Sulouff et al.

[11] Patent Number: 4,522,072
[45] Date of Patent: Jun. 11, 1985

[54] ELECTROMECHANICAL TRANSDUCER STRAIN SENSOR ARRANGEMENT AND CONSTRUCTION

[75] Inventors: Robert E. Sulouff; Sam S. Hartin; Koy B. Cook; David V. Kerns, Jr.; Jimmy L. Davidson; Keith O. Warren, all of Auburn, Ala.

[73] Assignee: Insouth Microsystems, Inc., Auburn, Ala.

[21] Appl. No.: 487,731

[22] Filed: Apr. 22, 1983

[51] Int. Cl.³ .............................................. G01L 1/18
[52] U.S. Cl. ...................................... 73/765; 73/766; 73/862.63; 73/517 R
[58] Field of Search ................. 73/765, 766, 862.63, 73/517 R, 518

[56] References Cited

U.S. PATENT DOCUMENTS

| | | | |
|---|---|---|---|
| 2,344,642 | 3/1944 | Ruge | 338/3 |
| 3,303,452 | 2/1967 | Booth | 338/5 |
| 3,448,607 | 6/1969 | Russell | 73/766 |
| 3,745,502 | 7/1973 | Watanabe | 338/3 |
| 3,759,093 | 9/1973 | Farr | 73/862.63 |
| 3,826,131 | 7/1974 | Pritschow | 73/766 |
| 3,828,294 | 8/1974 | Baba et al. | 338/43 |
| 3,918,019 | 10/1975 | Nunn | 338/42 |
| 3,968,466 | 7/1976 | Nakamura et al. | 338/42 |
| 4,021,766 | 5/1977 | Aine | 338/2 |
| 4,023,562 | 5/1977 | Hyneck et al. | 128/748 |
| 4,050,049 | 9/1977 | Youmans | 338/47 |
| 4,065,970 | 1/1978 | Wilner | 73/727 |
| 4,071,838 | 1/1978 | Block | 338/47 |
| 4,141,253 | 2/1979 | Whitehead, Jr. | 73/727 |
| 4,144,516 | 3/1979 | Aine | 338/2 |
| 4,191,057 | 3/1980 | Busta | 73/777 |
| 4,236,137 | 11/1980 | Kurtz et al. | 338/4 |
| 4,275,406 | 6/1981 | Mueller et al. | 357/26 |
| 4,299,130 | 11/1981 | Koneval | 73/766 |
| 4,300,395 | 11/1981 | Shirouzu et al. | 73/708 |
| 4,430,895 | 2/1984 | Colton | 73/517 R |

OTHER PUBLICATIONS

Dissertation submitted to Stanford University, Nov. 1977.
Electronic Design, 4, Feb. 15, 1978, pp. 36-37.
Technical Report AFAL-TR-77-152, Sep. 1977.
Technical Report AFAL-TR-79-1175, Dec. 1979.

Primary Examiner—Anthony V. Ciarlante
Attorney, Agent, or Firm—Banner, Birch, McKie & Beckett

[57] ABSTRACT

A miniature, solid state, cantilever beam accelerometer is constructed with an arrangement of strain sensing elements which provides for simpler temperature compensation, dual-axis acceleration measurement, and the capability of correcting for nonlinearity in a strain sensing element. Temperature compensation is facilitated by locating two strain sensing elements on the cantilever beam and two on the main body of the accelerometer and connecting the four elements in a Wheatstone bridge. Instead of a single bridge, two half bridges may be formed to allow for independent adjustment of each side of the Wheatstone bridge. Independent adjustment is also possible by using two full bridges with all strain sensing elements oriented in the same direction. If the elements of one bridge are oriented in an orthogonal direction, the accelerometer is capable of measuring both on-axis and off-axis accelerations. The strain sensing elements may be FET's or resistors and may be deposited upon, or formed integrally with, the accelerometer.

43 Claims, 11 Drawing Figures

ELECTROMECHANICAL TRANSDUCER STRAIN SENSOR ARRANGEMENT AND CONSTRUCTION

TECHNICAL FIELD

This invention relates to the construction and arrangement of strain sensing elements in electromechanical transducers such as miniature, solid-state accelerometers.

BACKGROUND OF THE INVENTION

Tiny, monolithic accelerometers, pressure sensors, and other electromechanical transducers find application in a wide range of disciplines, from internal combustion engine automatic control systems to in vivo sensors for medical research to implantable hearing aids. In general, these transducers all have similar structures. A main body, which is relatively rigid, provides support for other elements of the transducer. Attached to the main body is a non-rigid or flexible structure which responds in some manner to an external stimulus applied to the transducer. For example, if the transducer is an absolute pressure sensor, the non-rigid structure may be a diaphragm covering an evacuated space in the main body. In order to detect the response, or strain, resulting from the external stimulus, or stress, strain sensing elements are attached to the non-rigid structure.

Usually, more than one of these elements is attached. This may be done either to provide a temperature reference or to increase the electrical output of the transducer. When four strain sensing elements are present, it is common to connect them in a Wheatstone bridge. For example, Nakamura U.S. Pat. No. 3,968,466 describes a miniature monolithic pressure transducer which has a circular diaphragm of monocrystalline silicon. Four piezoresistive strain sensing elements are formed in the diaphragm, oriented along the crystal axes so as to provide maximum sensitivity to strain. The four piezoresistors are, as shown in FIG. 6 of Nakamura, connected in a Wheatstone bridge.

The strain sensing elements of Nakamura and many of the other transducers operate on the principle of piezoresistance. That is, theyundergo a change in resistivity when mechanically deformed. Their resistivity is thus a measure of the amount of strain which the piezoresistors are experiencing. One such piezoresistive material is silicon. When it is desired to sense strain in a member, silicon piezoresistors may be deposited directly on the member, or, if the member itself is made of silicon, the piezoresistors may be formed integrally with it by one of the recognized methods, such as diffusion or ion implantation. The strain sensing elements described in Nakamura were formed in this way.

There are several obstacles to accurate mechanical-to-electrical conversion in transducers such as that described in Nakamura. One is the well-known dependence of semiconductor resistivity on temperature. Since the resistance of the strain sensing elements is to be used as a measure of strain, variations in that resistance due to factors other than strain, such as temperature, must be avoided. The Nakamura device attempts to accomplish this by placing all of the piezoresistors near one another. Another method of compensating for temperature is disclosed in Whitehead U.S. Pat. No. 4,141,253, which describes a force transducing cantilever beam. Six piezoresistors are diffused into the surface of the silicon beam, which is the non-rigid or flexing structure. The six resistors, connected in a Wheatstone bridge, perform different functions. Two are used to sense strain, two are dummy resistors, and the remaining two "are used for temperature compensation purposes." Although it is more accurate to compensate for temperature by means of dedicated piezoresistors, as done in Whitehead, than by simply grouping all of the strain sensing elements in a small area, the Whitehead arrangement still does not give acceptable results. One reason is that the temperature measuring resistors are formed in the cantilever beam along with the strain sensing resistors; both sets therefore measure strain as well as temperature. Since the output of this transducer includes both strain related and temperature related terms, temperature compensation must be accomplished externally, by a separate circuit. These calculations are complicated and the circuitry necessary to perform them is complex. The other reason for lack of acceptable results from the Whitehead transducer is due to the orientation of the temperature sensing resistors. While the strain sensing resistors are oriented along a direction of maximum strain, the temperature sensors are given a slightly different orientation in order to provide a mathematical basis for substracting the temperature terms. This off-axis orientation leads to inaccuracy in sensing along the desired axis, as will be described below.

An improved method of temperature compensation is described in Roylance, "A Miniature Integrated Circuit Accelerometer For Biomedical Applications," dissertation submitted to Department of Electrical Engineering, Stanford University, Nov., 1977. There, the strain sensing element is diffused into the surface of the cantilever beam, while the temperature-sensing element is diffused into a portion of the main body. The resistivity of the latter sensor, therefore, depends only upon temperature and not upon the strain of the beam. Even this arrangement, however, does not completely avoid the difficulties of temperature compensation. Roylance connects the two piezoresistors as adjacent arms in a Wheatstone bridge in which the remaining two arms are ordinary resistors. The output voltage of this transducer therefore includes both strain dependent and temperature dependent terms; and the temperature dependent terms must be removed by complex external circuits.

Another source of inaccuracy in these transducers is, as mentioned above in connection with the Whitehead reference, the possibility of measuring off-axis forces or accelerations. Since the electrical output of the transducer is indicative only of the magnitude of the acceleration, other factors must be considered in order to determine its direction. These factors are the orientation of the transducer itself, the directions of the crystal axes within the transducer body (for semiconductor transducers), and the orientation of the strain sensing elements. For any particular transducer construction, there will be a principal axis such that forces or accelerations along that axis are manifested more strongly than those along other axes. For the cantilever beam, for example, this principal axis is normal to the surface of the beam. If it is desired to measure accelerations in a particular direction, the transducer must be positioned so that its principal axis is aligned in that direction, and the strain sensing elements on the transducer must oriented along the direction of maximum strain of the transducer's non-rigid or flexing structure. Any variation in either the attitude of the transducer or the orientation of the piezoresistors will result in detection of an acceleration in a direction other than the desired direction. Conversely, if it is desired to measure an acceleration of unknown direction, a transducer constructed with a view toward measuring acceleration along only its principal axis will only indicate that component of the true acceleration.

One accelerometer design which purports to cancel off-axis acceleration measurements is described in U.S. Air Force Technical Report AFAL-TR-79-1175, *Cantilever Accelerometer* (Dec., 1979). In this accelerometer, eight piezoresistive elements are located on the flexible portion of the device, with four bing oriented so that their resistance increases with acceleration and the other four so that their resistance decreases with acceleration. The interconnection among these elements is a "dual-transverse bridge." The orientation and interconnection of the piezoresistors, together with the use of a symmetric proof mass (a large mass which responds to applied accelerations) is said to allow for cross-axis insensitivity.

Another factor contributing to below optimum performance of the prior art accelerometers described here is lack of uniformity among strain sensing elements formed on the same transducer. For best results, at any given level of stress, these elements should be as nearly equal as possible in both overall resistance and "gauge factor," which is the fractional change in resistance at specified stress. The gauge factor is a measure of the transducer's sensitivity. There are essentially two ways in which sensitivity can be increased: increasing the gauge factor or increasing the current through (and therefore the voltage across) the piezoresistors. Current, of course, is limited by the capacity of the device to dissipate heat.

SUMMARY OF THE INVENTION

One object of this invention is to provide an electromechanical transducer, including piezoresistive strain sensing elements, in which the effects of temperature on the resistance of the strain sensing elements may be corrected simply and with a minimum of external circuitry.

Another object is to provide such a transducer in which the strain sensing elements are capable of measuring strain both in a direction of maximum strain and in a direction other than the direction of maximum strain.

Another object is to provide such a transducer in which nonuniformity among the strain sensing elements may be effectively corrected.

Another object is to provide such a transducer having greater sensitivity than previous transducers.

Another object is to provide such a transducer in which current through the strain sensing elements may be controlled.

The transducer of the present invention, like prior art transducers, includes a relatively rigid main body to support the other elements of the transducer and a non-rigid or flexing structure attached to the main body to respond in some manner to a stress applied to the transducer. The novelty of the present invention resides in the construction and arrangement in the strain sensing elements which are placed on the transducer.

One aspect of the invention involves attaching two strain sensing elements to the non-rigid structure of the transducer and two strain sensing elements to the main body and then connecting these four elements in a Wheatstone bridge in which the two elements attached to the non-rigid structure are in one pair of opposing arms of the bridge and the two elements attached to the main body are in the other pair of opposing arms of the bridge. When a voltage is applied to the bridge's input terminals, the differential voltage at the output terminals is representative of the strain occurring in the non-rigid structure (and, therefore, the stress being applied to the transducer), and the effect of temperature is automatically minimized in the output signal.

Another aspect of the invention is to place eight strain sensing elements on the transducer instead of four, connecting the eight elements in two separate bridges. As noted above, a transducer such as an accelerometer has a direction of maximum strain corresponding to a principal axis of acceleration. With two full bridges, the strain sensing elements of one bridge can be oriented to sense strain in the direction of maximum strain and the strain sensing elements of the other bridge can be oriented to sense strain in a direction other than the direction of maximum strain. If the transducer is measuring acceleration, therefore, acceleration can be measured along both the principal axis of acceleration and an axis other than the principal axis of acceleration.

Alternatively, all eight strain sensing elements could be oriented to sense strain along the direction of maximum strain. Then the two bridges would ideally be sensing the same stress and producing the same output. Two identical bridges would have several advantages over a single bridge. First, the transducer would have increased sensitivity, since the output of the two bridges could be added together, doubling the output for a given level of stress. Second, if there were an error or irregularity in one of the strain sensing elements, the effect of that error or irregularity on the output signal would be reduced by deriving the output signal from a combination of both bridges. Also, any error or irregularity in the bridges could be separately compensated for each bridge, making the output signal more accurate.

A similar effect, of course, is achieved by a third aspect of the invention, the use of only four strain sensing elements combined into two half bridges or voltage dividers. In each half bridge, one strain sensing element is connected to the transducer's non-rigid structure, while the other is connected to the main body. The input voltages for the voltage dividers are separately variable, and the output signal of the transducer is the difference between the input voltages of the two half bridges. Any error or irregularity in either half bridge may be compensated by adjusting the input voltage for that half bridge alone. This two-half-bridge arrangement may also be substituted for full bridges in multi-bridge transducers (such as those in which eight strain sensing elements are involved).

Another aspect of the invention is the use of field effect transistors (FET's) instead of resistors as the strain sensing elements. When the FET is operated in its ohmic region, it is capable of functioning as a voltage-variable resistor. That is, the linear relationship between drain current $I_d$ and drain-to-source voltage $V_{ds}$ can be varied by changing the gate-to-source voltage $V_{gs}$. This characteristic of the FET makes it possible to independently balance each arm of the Wheatstone bridge in order to compensate for any differences in the characteristics of the strain sensing elements formed on the transducer. Control of the overall bridge resistance also makes it possible to avoid excessive bridge current while still maintaining an acceptable output signal level.

Also, field effect transistors are electrically adjustable and consequently offer the advantage of resistance concentration in the regions of maximum strain providing more sensitivity (a higher gauge factor) than piezoresistors.

Other objects and features of this invention will become apparent from the following description taken in connection with the accompanying drawings wherein are set forth, by way of illustration and example, certain embodiments of this invention.

DETAILED DESCRIPTION OF THE PREFERRED EMBODIMENT

Figure 1:
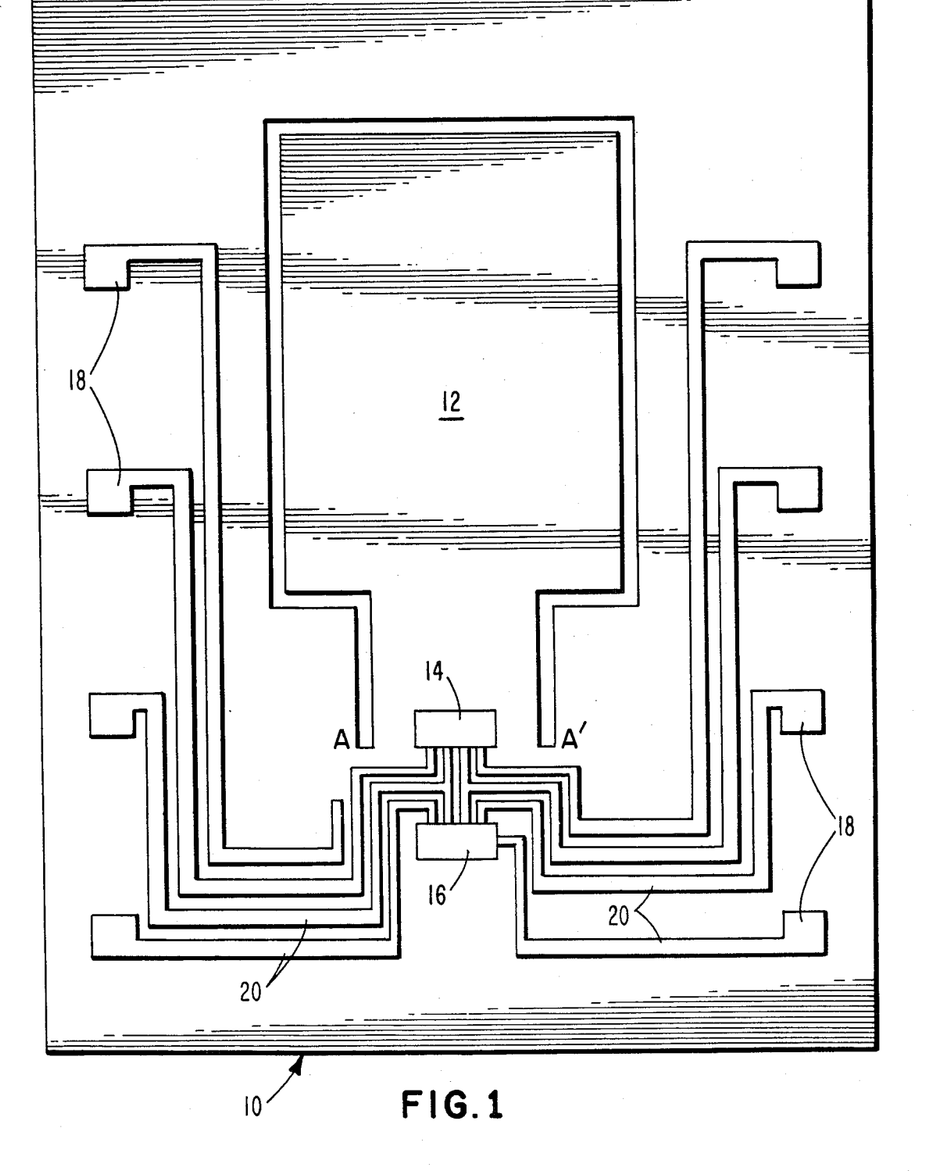
FIG. 1 is a top plan view of the preferred embodiment of the present invention.

The preferred embodiment of the present invention is a miniature, solid-state accelerometer formed on a single chip of silicon. As shown in FIG. 1, the accelerometer includes a main body 10, which is the silicon chip. Attached to the main body along an imaginary line drawn between points A—A' is a cantilever beam 12 which is free to swing toward and away from the observer (as viewed in FIG. 1) as main body 10 undergoes acceleration. The principal axis of acceleration, along which acceleration will produce the greatest movement of cantilever beam 12, is normal to the page on which FIG. 1 is drawn. The accelerometer also includes two sensor areas 14 and 16 which will be described in greater detail in connection with FIG. 2. It should be noted that sensor area 14, being above line A—A', is on cantilever beam 12, while sensor area 16, being below line A—A', is on main body 10. The accelerometer also includes a number of bonding pads 18 connected to various points on the accelerometer through interconnect metallization 20.

Figure 2:
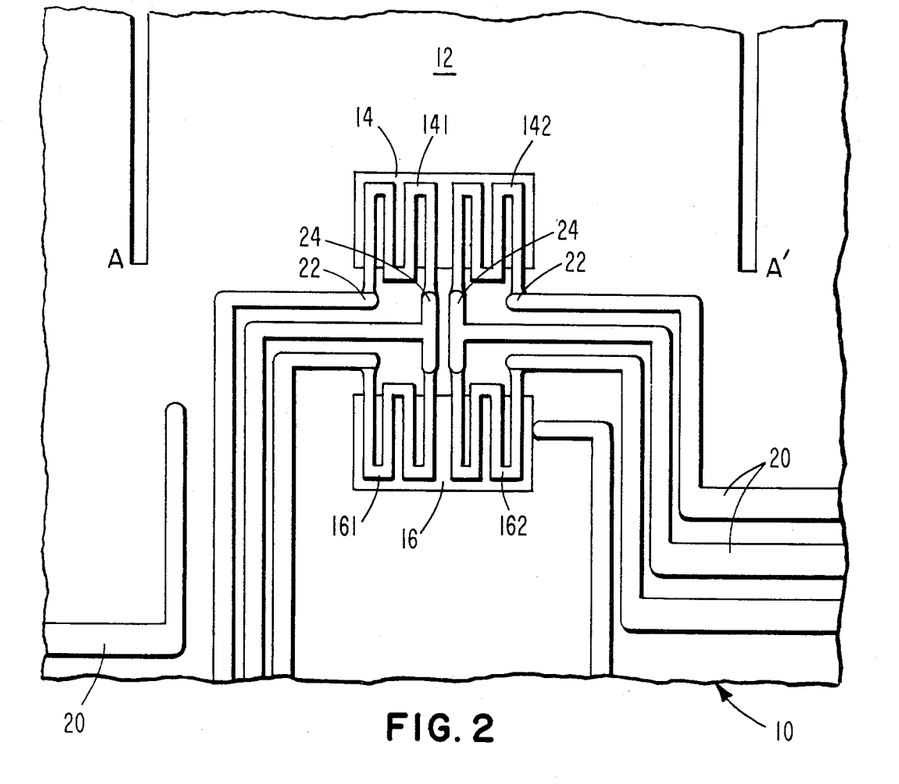
FIG. 2 is a magnified view of the sensor areas and adjacent areas of the electromechanical transducer shown in FIG. 1.

FIG. 2 is a magnified view of the sensor areas and adjacent areas of the accelerometer shown in FIG. 1. Sensor area 14 contains two field effect transistors (FET's) 141 and 142, and sensor area 16 also contains two FET's, 161 and 162. One end of each FET is connected to an electrode 22 which, for convenience, will be called the source electrode; the other end of each FET is connected to an electrode 24 which will be called the drain electrode. This denomination of electrodes is purely arbitrary, since either end of a FET may be used as the source.

It can be seen that the major portion of each transistor is aligned in a direction perpendicular to line A—A', along which cantilever beam 12 is attached to main body 10. The major portion of each transistor is also aligned perpendicular to the principal axis of acceleration (which is into the page, as noted above). The direction of alignment of the transistors is therefore the direction of maximum strain, since it is this direction along which the greatest strain of cantilever beam 12 will be noticed as it flexes in response to an acceleration of the main body along the principal axis.

Figure 3:
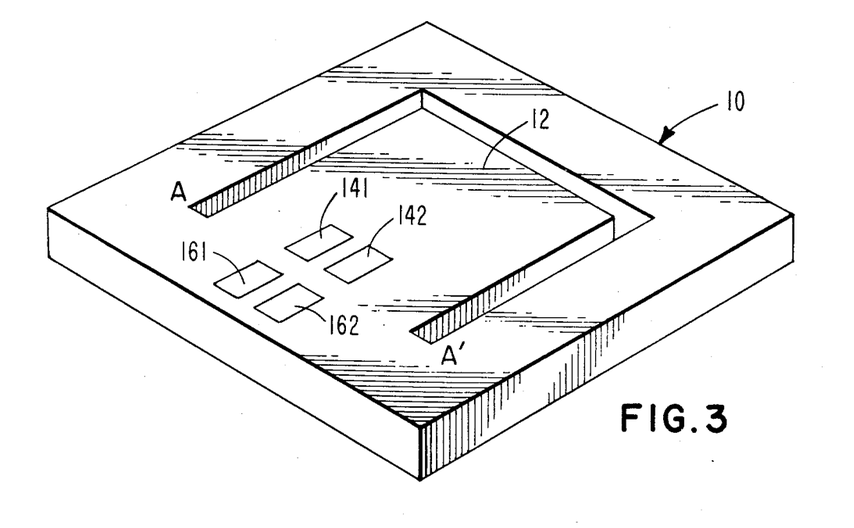
FIG. 3 is a simplified schematic diagram of one embodiment showing the arrangement of strain sensing elements.

FIG. 3 is a simplified schematic diagram of the accelerometer structure and the arrangement of the field effect transistors. Since the transistors function as piezo resistors, their verbal description and the symbols used to describe them will refer to them as resistors. As can be more clearly seen in FIG. 3, the orientation of the four piezo resistors is along the direction of maximum strain.

Figure 4:
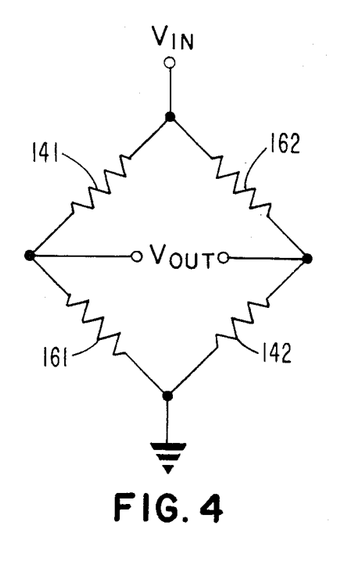
FIG. 4 is the electrical schematic diagram of the interconnections among the strain sensing elements of FIG. 3.

FIG. 4 is an electrical schematic diagram showing the way in which the four piezoresistors of FIG. 3 would be interconnected in order to sense acceleration along the principal axis. Resistors 141 and 142, which are on cantilever beam 12 and therefore sense strain in the beam, occupy two opposing arms of the Wheatstone bridge. The other two opposing arms of the bridge are occupied by resistors 161 and 162, which are on the main body 10 of the accelerometer and therefore sense strain in the main body.

When a voltage $V_{in}$ is applied to the bridge of FIG. 4, assuming $R_{141} = R_{142}$ and $R_{161} = R_{162}$, $V_{out}$ is given by the equation:

$$V_{out} = V_{in}\left(\frac{R_{141} - R_{161}}{R_{141} + R_{161}}\right) \tag{1}$$

where the R terms indicate the resistance values of the appropriate resistors. Since resistors 141 and 142 are on cantilever beam 12, $R_{141}$ and $R_{142}$ are functions of both strain in the beam and other, undesired factors, such as temperature. Resistors 161 and 162, on the other hand, being on main body 10, do not sense strain. Their resistance, $R_{161}$ or $R_{162}$, is a function only of the undesired factors. If f(S) is used to designate the component of each resistance which is a function of strain in beam 12 and g(T) designates the component of each resistance which is a function of other factors, such as temperature, then the following relationships apply:

$$R_{141} = f(S) + g(T) \tag{2}$$

$$R_{142} = f(S) + g(T) \tag{3}$$

$$R_{161} = g(T) \tag{4}$$

$$R_{162} = g(T) \tag{5}$$

In this case, $V_{out}$ will be a relatively simple function of f(S) and g(T):

$$V_{out} = \frac{f(S)}{f(S) + 2g(T)} \tag{6}$$

Figure 5:
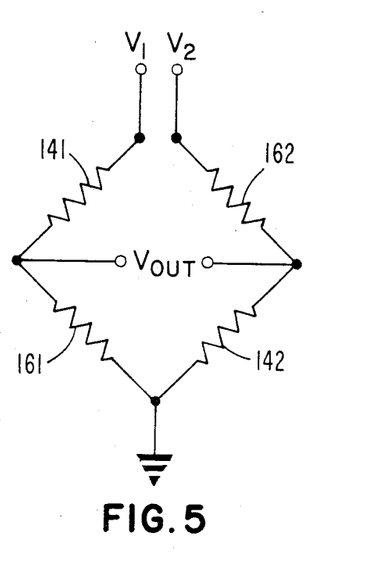
FIG. 5 is an electrical schematic diagram of the interconnections among the strain sensing elements of the structure of FIG. 3, FIG. 6, or FIG. 9 in another embodiment of the invention.

FIG. 5 is an electric schematic diagram of another embodiment of the present invention. If resistors 141, 142, 161 and 162 of FIG. 3 are connected as separate voltage divider circuits as shown in FIG. 5, it becomes possible to independently adjust each half of the Wheatstone bridge to compensate for differences in the characteristics of the piezoresistors. During calibration of the accelerometer, $V_1$ and $V_2$ will be adjusted so that $V_{out}$ approaches the value defined by equation (6) as closely as possible. Thereafter, the output signal $V_{out}$ will be used as the output signal of the accelerometer without regard to the dual input voltages just as if the circuit were as shown in FIG. 4.

Figure 6:
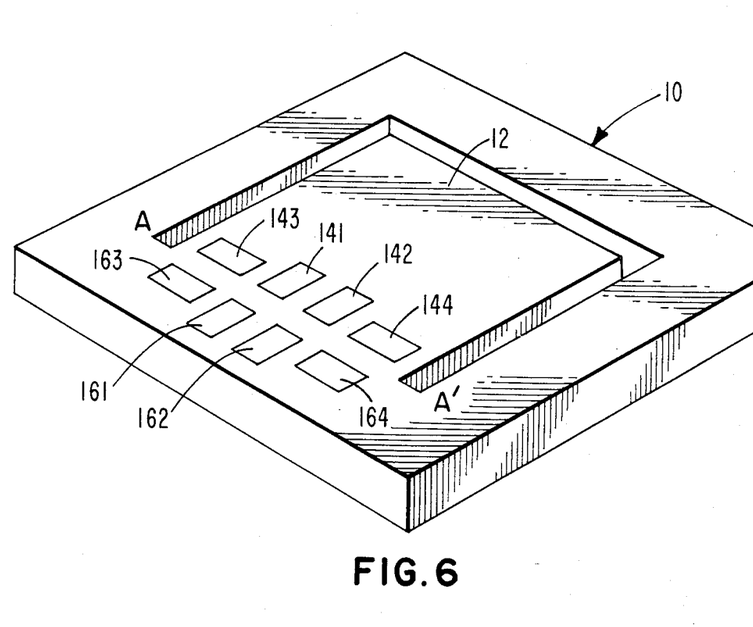
FIG. 6 is a simplified schematic diagram of a third embodiment of the invention showing the arrangement of strain sensing elements.

FIG. 6 is a simplified schematic diagram of still another embodiment of the invention. In this embodiment, sensor areas 14 and 16 are each expanded to accommodate two more strain sensing elements, 143 and 144 on cantilever beam 12 and 163 and 164 on main body 10. As can be seen from FIG. 6, the additional resistors are oriented in a direction other than the direction of maximum strain. In this case, that direction is perpendicular to the direction of maximum strain. The additional piezoresistors, therefore, will sense strain which is orthogonal to the strain sensed by the original four piezoresistors. The eight piezoresistors may also be connected as two sets of two half bridges each, in the configuration shown in FIG. 5. ($R_{143}$, $R_{144}$, $R_{163}$, and $R_{164}$ would be connected, respectively, in the same positions as $R_{141}$, $R_{142}$, $R_{161}$, and $R_{162}$.)

Figure 7:
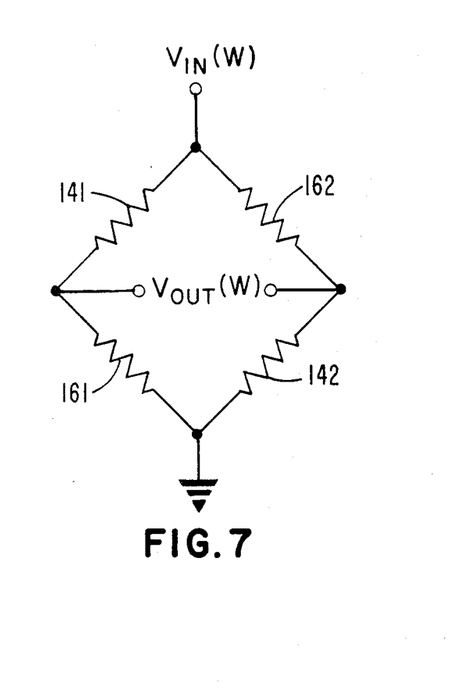
FIGS. 7 and 8 are the electrical schematic diagrams of the interconnections among the strain sensing elements of the transducers of either FIG. 6 or FIG. 9.
Figure 8:
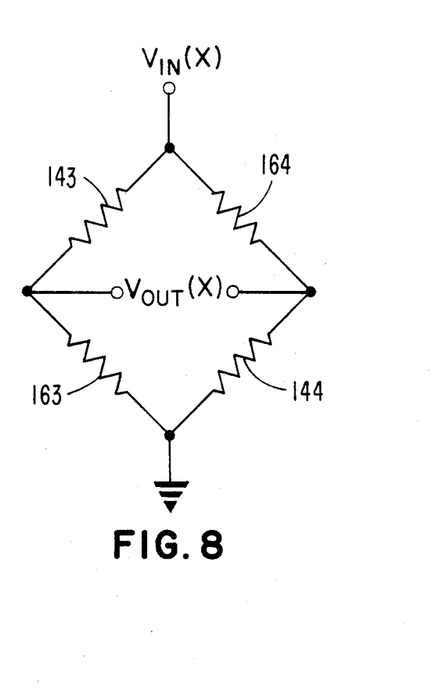

FIGS. 7 and 8 are the electrical schematic diagrams showing the interconnections of the resistors of FIG. 6. There are two independent bridges, each with its own input and output voltages. Bridge W, shown in FIG. 7, senses acceleration along the principal axis, as does the bridge of FIG. 4. Bridge X, in FIG. 8, senses off-axis acceleration, that is, acceleration which produces a strain in the direction of orientation of resistors 143, 144, 163 and 164. Therefore, this arrangement makes it possible to detect two independent components of the transducer's acceleration and thus derive additional acceleration information from a single transducer.

Figure 9:
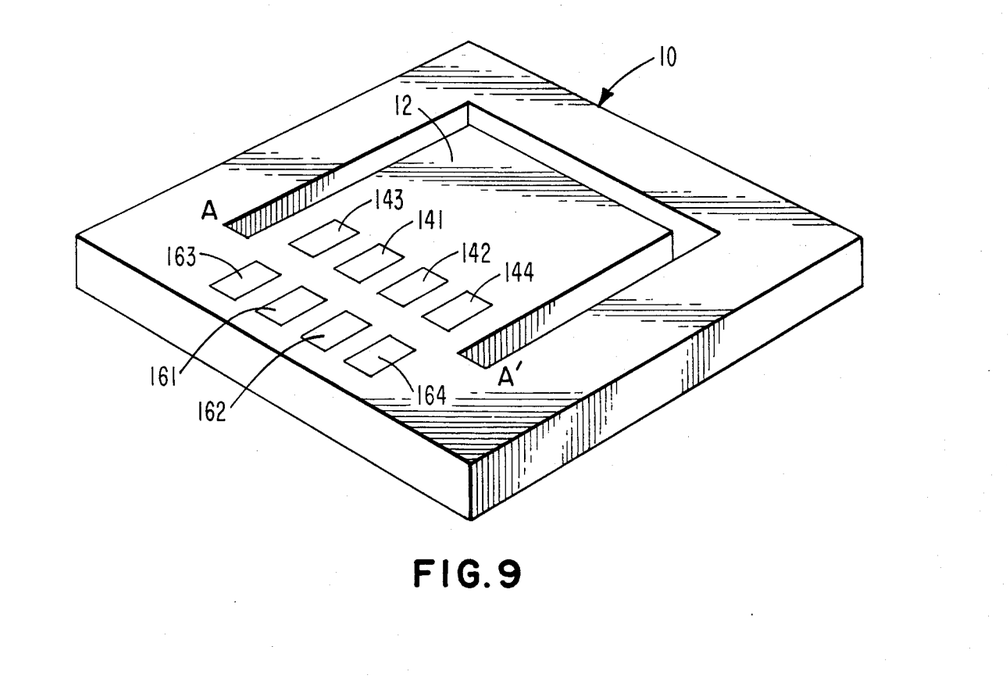
FIG. 9 is a simplified schematic diagram of a fourth embodiment showing the arrangement of strain sensing elements.

FIG. 9 illustrates schematically yet another embodiment of the present invention. In this case, there are a total of eight piezoresistors, just as in the embodiment of FIG. 6. Here, however all eight piezoresistors are oriented in the same direction and sense strain in a single direction.

The electrical connections for the embodiment of FIG. 9 are the same as those shown in FIGS. 7 and 8. Each bridge senses the same strain; and their outputs may be added together to provide increased sensitivity while at the same time minimizing the effect of any nonlinearity in one of the bridges. The eight piezoresistors may also be connected as two sets of two half bridges each, in the configuration shown in FIG. 5. ($R_{143}$, $R_{144}$, $R_{163}$, and $R_{164}$ would be connected, respectively, in the same positions as $R_{141}$, $R_{142}$, $R_{161}$, and $R_{162}$.)

Figure 10:
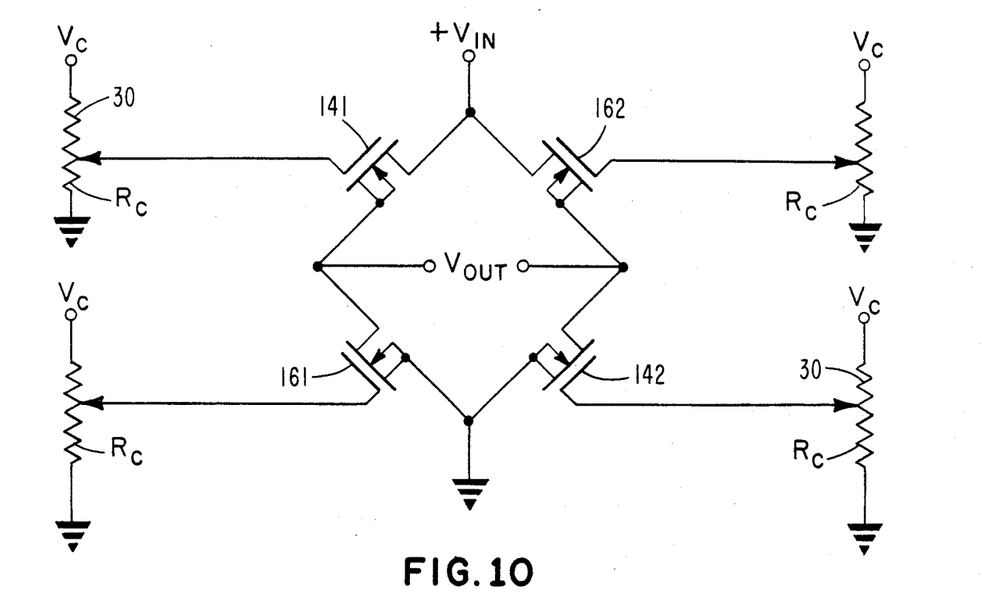
FIG. 10 is an electrical schematic diagram illustrating the use of field effect transistors in the circuit of FIG. 4, 5, 7 or 8.

Although the foregoing description referred to the strain sensing elements as resistors, in the preferred embodiment they are field effect transistors. FIG. 10 is the electrical schematic diagram of FIG. 4 illustrating the way in which FET's would be used in that circuit. (The FET's would be used in the same manner in the circuits of FIGS. 5, 7 and 8.) The gate of each FET is connected to its own compensation circuit 30 which produces an adjustable gate bias voltage. Compensation circuit 30 is a conventional voltage divider circuit consisting of a potentiometer $R_c$ connected between a voltage source $V_c$ and ground. During calibration of the accelerometer, each potentiometer $R_c$ is adjusted so that $V_{out}$ accurately represents the acceleration of the transducer.

Figure 11:
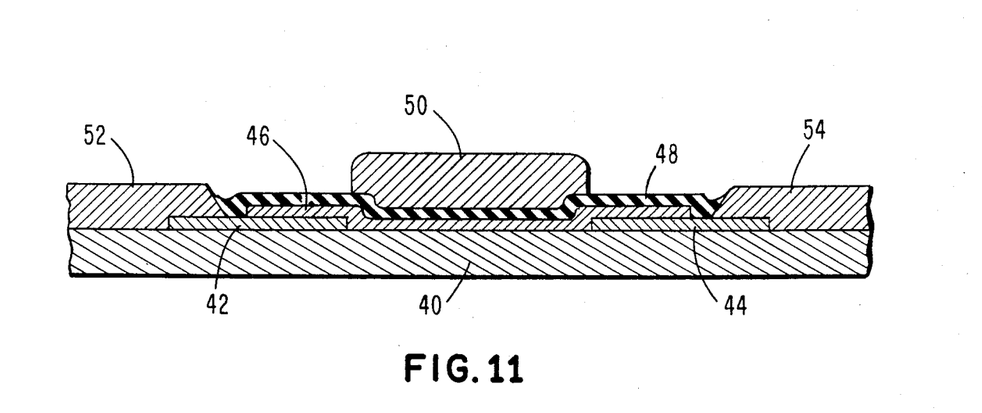
FIG. 11 is a cross-sectional view of the structure of a field effect transistor which is suitable for use in the present invention.

The field effect transistors may be constructed in any conventional manner, such as by vapor deposition techniques. FIG. 11 illustrates a cross section of a typical thin-film FET used in this invention. The substrate 40 is either main body 10 or cantilever beam 12, depending upon the location of the transistor. Deposited on substrate 40 are source 42 and drain 44 which, as mentioned above, are interchangeable. These may be made of any suitable material well-known to those skilled in the art, such as chromium. A layer 46 of a semi-conductor, such as cadmium selenide or another suitable channel material, is then deposited so as to form the channel between source 42 and drain 44. An insulating layer 48, of alumina or another suitable insulator, isolates the gate 50 from the rest of the transistor. Gate 50, source electrode 52 and drain electrode 54 may be made of aluminum. The FET's may also be formed integrally with a semiconductor substrate, by diffusion or ion bombardment, which are conventional techniques.

Although fabrication of the accelerometer is well within the abilities of those skilled in the art, the method of fabrication will be briefly described.

Since crystal silicon of the <100> orientation is prepared to a precise thickness, parallelism and flatness having both sides lapped and polished. A protective film is grown on the surface of the wafer using the native oxide. Using photolithographic techniques familar to those skilled in the art, a pattern is created on the protective oxide layer.

A shallow groove is formed by etching the top side of the silicon wafer with potassium hydroxide and isopropyl alcohol for a time period of from five to sixty minutes at a temperature of 80° C. to facilitate the later formation of the beam. The depth of this top side groove is used to control the final thickness of the thin section of the beam.

The placement and structure of the strain sensing elements are defined on the top surface of the silicon wafer using photolithographic techniques. An oxide of silicon is grown on the surface. A layer of chromium is placed on the back surface and patterned to define the etched region of the accelerometer.

The front side of the silicon wafer is patterned for contact to the strain sensing elements by removal of the oxide. A layer of aluminum metallization is deposited on the front surface and patterned to provide electrical contact to the strain sensing elements. The pattern for the definition of the individual elements is repeated many times across the wafer to produce many individual accelerometers from a single silicon wafer.

The silicon wafer is mounted with the strain sensing elements face down in a protective medium such as wax prior to exposure to the potassium hydroxide and isopropyl alcohol etch at 80° C. This mounting technique prevents the structures placed on the top side of the wafer from being damaged in the etch.

During the etch of the beam structure the edges of the individual devices may be etched facilitating the formation and collection of many individual devices from one silicon wafer.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention. For example, resistors could be used in place of transistors as the strain sensing elements, and either of these types of devices could be manufactured by diffusion, ion implantation, or vapor deposition techniques. Deposited materials may be polysilicon, cadmium selenide, cadmium sulfide, or any other suitable semiconductor. Both junction field effect transistors (JFET's) and insulated gate field effect transistors (IGFET's) may be used.

We claim:

1. In an electromechanical transducer having a main body and flexing means attached to said main body for flexing in response to an external stimulus applied to said transducer, strain sensing means responsive to flexion of said flexing means for providing an output signal representative of the external stimulus, said strain sensing means comprising:

a first piezoresistive voltage divider connected across a first source of electrical power, said first piezoresistive voltage divider comprising in series a piezoresistive strain sensing element coupled to said flexing means, an output terminal, and a piezoresistive strain sensing element coupled to said main body, said first piezoresistive voltage divider providing across said piezoresistive strain sensing element coupled to said main body a voltage representing non-strain effects in said main body;

a second piezoresistive voltage divider connected across a second source of electrical power, said second piezoresistive voltage divider comprising in series a piezoresistive strain sensing element coupled to said main body, an output terminal, and a piezoresistive strain sensing element coupled to said flexing means, said second piezoresistive voltage divider providing across said piezoresistive strain sensing element coupled to said flexing means a voltage representing strain in said flexing means; and output means coupled to said output terminals for providing, as the output signal, the voltage between said terminals.

2. The strain sensing means of claim 1 wherein said piezoresistive strain sensing elements comprise resistors.

3. The strain sensing means of claim 1 wherein said piezoresistive strain sensing elements comprise transistors.

4. The strain sensing means of claim 3 wherein said transistors comprise insulated gate field effect transistors.

5. The strain sensing means of claim 1 wherein said piezoresistive strain sensing elements are intimately attached to said main body and said flexing means.

6. The strain sensing means of claim 5 wherein said main body and said flexing means comprise semiconductor material and said piezoresistive strain sensing elements are formed by vapor deposition on said semiconductor material.

7. The strain sensing means of claim 1 wherein said main body and said flexing means comprise semiconductor material and said piezoresistive strain sensing elements are formed integrally with said semiconductor material.

8. The strain sensing means of claim 7 wherein said piezoresistive strain sensing elements are formed in said main body and said flexing means by diffusion.

9. The strain sensing means of claim 1 wherein said flexing means has a direction of maximum strain, said piezoresistive strain sensing elements coupled to said flexing means sensing strain in substantially said direction of maximum strain.

10. In an electromechanical transducer having a main body and flexing means attached to said main body for flexing in response to an external stimulus applied to said transducer, said flexing means having a direction of maximum strain corresponding to a principal axis of the external stimulus, strain sensing means responsive to flexion of said flexing means for providing a first output signal representative of a component of the external stimulus in a direction substantially parallel to the principal axis and a second output signal representative of a component of the external stimulus in a direction other than substantially parallel to the principal axis, and strain sensing means comprising:

a first input port to be connected to a first source of electrical power;

a first output port to deliver the first output signal;

a first piezoresistive full bridge electrically connecting said first input port and said first output port and having two pairs of opposing arms, said first piezoresistive full bridge comprising two piezoresistive strain sensing elements coupled to said flexing means and forming one of said pairs of opposing arms to sense strain in said flexing means substantially in the direction of maximum strain and two piezoresistive strain sensing elements coupled to said main body and forming the other of said pairs of opposing arms to sense non-strain effects in a said main body substantially in the direction to maximum strain;

a second input port to be connected to a second source of electrical power;

a second output port to deliver the second output signal; and a second piezoresistive full bridge electrically connecting said second input port and said second output port and having two pairs of opposing arms, said second piezoresistive full bridge comprising two piezoresistive strain sensing elements coupled to said flexing means and forming one of said pairs of opposing arms to sense strain in said flexing means in a direction other than the direction of maximum strain and two piezoresistive strain sensing elements coupled to said main body and forming the other of said pairs of opposing arms to sense non-strain effects in said main body substantially in the direction other than the direction of maximum strain.

11. The strain sensing means of claim 10 wherein said piezoresistive strain sensing elements comprise resistors.

12. The strain sensing means of claim 10 wherein said piezoresistive strain sensing elements comprise transistors.

13. The strain sensing means of claim 12 wherein said transistors comprise insulated gate field effect transistors.

14. The strain sensing means of claim 10 wherein said piezoresistive strain sensing elements are intimately attached to said main body and said flexing means.

15. The strain sensing means of claim 14 wherein said main body and said flexing means comprise semiconductor material and said piezoresistive strain sensing elements are formed by vapor deposition on said semiconductor material.

16. The strain sensing means of claim 10 wherein said main body and said flexing means comprise semiconductor material and said piezoresistive strain sensing elements are formed integrally with said semiconductor material.

17. The strain sensing means of claim 16 wherein said piezoresistive strain sensing elements are formed in said main body and and flexing means by diffusion.

18. In an electromechanical transducer having a main body and flexing means attached to said main body for flexing in response to an external stimulus applied to said transducer, strain sensing means responsive to flexion of said flexing means for providinig an output signal representative of the external stimulus, said strain sensing means comprising:

a first input port to be connected to a first source of electrical power;

a first output port to deliver a first output signal;

a first piezoresistive full bridge electrically connecting said first input port and said first output port and having two pairs of opposing arms, said first piezoresistive full bridge comprising two piezoresistive strain sensing elements coupled to said flexing means and forming one of said pairs of opposing arms to sense strain in said flexing means in a predetermined direction and two piezoresistive strain sensing elements coupled to said main body and forming the other of said pairs of opposing arms to sense non-strain effects in said main body in the predetermined direction;

a second input port to be connected to a second source of electrical power;

a second output port to deliver a second output signal;

a second piezoresistive full bridge electrically connecting said second input port and said second output port and having two pairs of opposing arms, said second piezoresistive full bridge comprising two piezoresistive strain sensing elements coupled to said flexing means and forming one of said pairs of opposing arms to sense strain in said flexing means in the predetermined direction and two piezoresistive strain sensing elements coupled to said main body and forming the other of said pairs of opposing arms to sense non-strain effects in said main body in the predetermined direction; and output means coupled to said first output port and said second output port for combining the first output signal and the second output signal into the output signal.

19. The strain sensing means of claim 18 wherein said piezoresistive strain sensing elements comprise resistors.

20. The strain sensing means of claim 18 wherein said piezoresistive strain sensing elements comprise transistors.

21. The strain sensing means of claim 20 wherein said transistors comprise insulated gate field effect transistors.

22. The strain sensing means of claim 18 wherein said piezoresistive strain sensing elements are intimately attached to said main body and said flexing means.

23. The strain sensing means of claim 22 wherein said main body and said flexing means comprise semiconductor material and said piezoresistive strain sensing elements are formed by vapor deposition on said semiconductor material.

24. The strain sensing means of claim 18 wherein said main body and said flexing means comprise semiconductor material and said piezoresistive strain sensing elements are formed integrally with said semiconductor material.

25. The strain sensing means of claim 24 wherein said piezoresistive strain sensing elements are formed in said main body and and flexing means by diffusion.

26. The strain sensing means of claim 18 wherein said flexing means has a direction of maximum strain, said piezoresistive strain sensing elements coupled to said flexing means sensing strain in substantially said direction of maximum strain.

27. In an electromechanical transducer having a main body and flexing means attached to said main body for flexing in response to an external stimulus applied to said transducer, said flexing means having a direction of maximum strain corresponding to a principal axis of the external stimulus, strain sensing means responsive to flexion of said flexing means for providing a first output signal representative of a component of the external stimulus in a direction substantially parallel to the principal axis and a second output signal representative of a component of the external stimulus in a direction substantially parallel to the principal axis and a second output signal representative of a component of the external stimulus in a direction other than substantially parallel to the principal axis, said strain sensing means comprising:

a first piezoresistive voltage divider connected across a first source of electrical power, said first piezoresistive voltage divider comprising in series a piezoresistive strain sensing element coupled to said flexing means, a first output terminal, and a piezoresistive strain sensing element coupled to said main body, said first piezoresistive voltage divider providing across said piezoresistive strain sensing element coupled to said main body a voltage representing non-strain effects in said main body substantially in the direction of maximum strain;

a second piezoresistive voltage divider connected across a second source of electrical power, said second piezoresistive voltage divider comprising in series a piezoresistive strain sensing element coupled to said main body, a second output terminal, and a piezoresistive strain sensing element coupled to said flexing means, said second piezoresistive voltage divider providing across said piezoresistive strain sensing element coupled to said flexing means a voltage representing strain in said flexing means substantially in the direction of maximum strain;

first output means coupled to said first and second output terminals for providing, as the first output signal, the voltage between said terminals;

a third piezoresistive voltage divider connected across a third source of electrical power, said third piezoresistive voltage divider comprising in series of piezoresistive strain sensing element coupled to said flexing means, a third output terminal, and a piezoresistive strain sensing element coupled to said main body, said third piezoresistive voltage divider providing across said piezoresistive strain sensing element coupled to said main body a voltage representing non-strain effects in said main body in a direction other than the direction of maximum strain;

a fourth piezoresistive voltage divider connected across a fourth source of electrical power, said fourth piezoresistive voltage divider comprising in series a piezoresistive strain sensing element coupled to said main body, a fourth output terminal, and a piezoresistive strain sensing element coupled to said flexing means, said fourth piezoresistive voltage divider providing across said piezoresistive strain sensing element coupled to said flexing means a voltage representing strain in said flexing means substantially in the direction other than the direction of maximum strain; and second output means coupled to said third and fourth output terminals for providing, as the second output signal, the voltage between said terminals.

28. The strain sensing means of claim 27 wherein said piezoresistive strain sensing elements comprise resistors.

29. The strain sensing means of claim 27 wherein said piezoresistive strain sensing elements comprise transistors.

30. The strain sensing means of claim 29 wherein said transistors comprise insulated gate field effect transistors.

31. The strain sensing means of claim 27 wherein said piezoresistive strain sensing elements are intimately attached to said main body and said flexing means.

32. The strain sensing means of claim 31 wherein said main body and said flexing means comprise semiconductor material and said piezoresistive strain sensing elements are formed by vapor deposition on said semiconductor material.

33. The strain sensing means of claim 27 wherein said main body and said flexing means comprise semiconductor material and said piezoresistive strain sensing elements are formed integrally with said semiconductor material.

34. The strain sensing means of claim 33 wherein said piezoresistive strain sensing elements are formed in said main body and said flexing means by diffusion.

35. In an electromechanical transducer having a main body and flexing means attached to said main body for flexing in response to an external stimulus applied to said transducer, strain sensing means responsive to flexion of said flexing means for providing an output signal representative of the external stimulus, said strain sensing means comprising:

a first piezoresistive voltage divider connected across a first source of electrical power, said first piezoresistive voltage divider comprising in series a piezoresistive strain sensing element coupled to said flexing means, a first output terminal, and a piezoresistive strain sensing element coupled to said main body, said first peizoresistive voltage divider providing across said piezoresistive strain sensing element coupled to said main body a voltage representing non-strain effects in said main body in a predetermined direction;

a second piezoresistive voltage divider connected across a second source of electrical power, said second piezoresistive voltage divider comprising in series a piezoresistive strain sensing element coupled to said main body, a second output terminal, and a piezoresistive strain sensing element coupled to said flexing means, said second piezoresistive voltage divider providing across said piezoresistive strain sensing element coupled to said flexing means a voltage representing strain in said flexing means in the predetermined direction;

a third piezoresistive voltage divider connected across a third source of electrical power, said third piezoresistive voltage divider comprising in series a piezoresistive strain sensing element coupled to said flexing means, a third output terminal, and a piezoresistive strain sensing element coupled to said main body, said third piezoresistive voltage divider providing across said piezoresistive strain sensing element coupled to said main body a voltage representing non-strain effects in said main body in the predetermined direction;

a fourth piezoresistive voltage divider connected across a fourth source of electrical power, said fourth piezoresistive voltage divider comprising in series a piezoresistive strain sensing element coupled to said main body, a fourth output terminal, and a piezoresistive strain sensing element coupled to said flexing means, said fourth piezoresistive voltage divider providing across said piezoresistive strain sensing element coupld to said flexing means a voltage representing strain in said flexing means in the predetermined direction; and output means coupled to said first, second, third, and fourth ouptut terminals for combining the voltages at said terminals into the output signal.

36. The strain sensing means of claim 35 wherein said piezoresistive strain sensing elements comprise resistors.

37. The strain sensing means of claim 35 wherein said piezoresistive strain sensing elements comprise transistors.

38. The strain sensing means of claim 37 wherein said transistors comprise insulated gate field effect transistors.

39. The strain sensing means of claim 35 wherein said piezoresistive strain sensing elements are intimately attached to said main body and said flexing means.

40. The strain sensing means of claim 39 wherin said main body and said flexing means comprise semiconductor material and said piezoresistive strain sensing elements are formed by vapor deposition on said semiconductor material.

41. The strain sensing means of claim 35 wherein said main body and said flexing means comprise semiconductor material and said piezoresistive strain sensing elements are formed integrally with said semiconductor material.

42. The strain sensing means of claim 41 wherein said piezoresistive strain sensing elements are formed in said main body and said flexing means by diffusion.

43. The strain sensing means of claim 35 wherein said flexing means has a direction of maximum strain and the predetermined direction is substantially said direction of maximum strain.

* * * * *